Dec. 15, 1925.　　　W. SCHMID　　　1,565,402
FISHING REEL
Filed Nov. 5, 1924
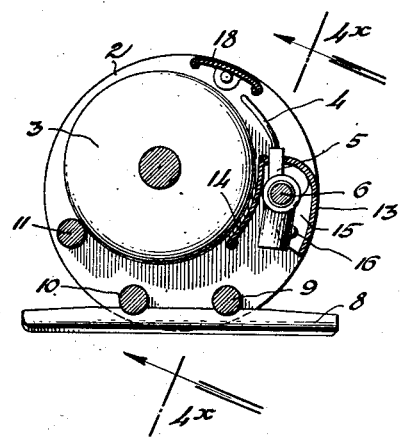
Fig. 2.
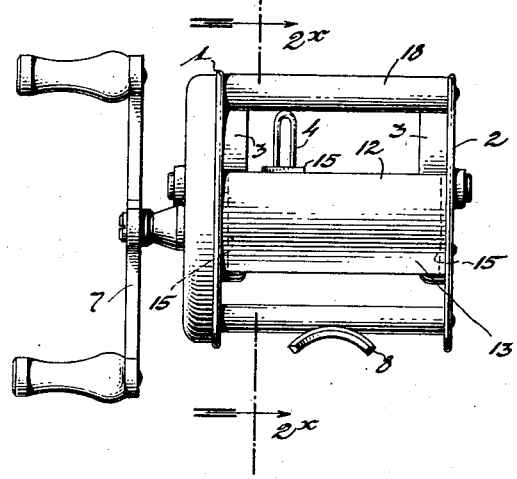
Fig. 1.
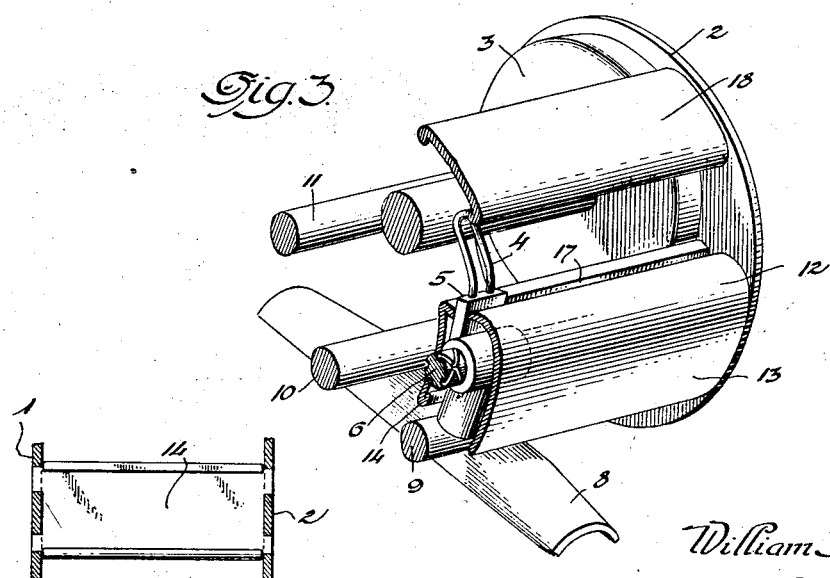
Fig. 3.
Fig. 4.
Inventor:
William Schmid
By
Attorneys Patented Dec. 15, 1925.

1,565,402

UNITED STATES PATENT OFFICE.

WILLIAM SCHMID, OF COLDWATER, MICHIGAN.

FISHING REEL.

Application filed November 5, 1924. Serial No. 747,882.

*To all whom it may concern:*

Be it known that I, WILLIAM SCHMID, a citizen of the United States, residing at Coldwater, in the county of Branch and State of Michigan, have invented certain new and useful Improvements in Fishing Reels, of which the following is a specification, reference being had therein to the accompanying drawings.

This invention relates to fishing reels of the type wherein a line guide is provided and reciprocated by a carriage screw arranged between the end rings or plates of the reel, which plates are usually connected together by means of posts, and it is an object of this invention to provide for a very rigid or durable connecting together of the said end rings or plates in a manner permitting the reduction of the number of posts otherwise required for that purpose, and at the same time utilizing certain of the connecting means for the purpose of protecting and guiding the carriage of the reel, whereby a superior and simpler reel is produced than is usual in reels of the type to which the invention appertains.

It is also an object of the said invention to provide a special form of tie connecting the end rings of a fishing reel, which tie is adapted to conceal the carriage screw and to guide the carriage in order to give true motion of the carriage and freedom from undue lack of rigidity of the parts, thereby ensuring a smooth and positive action thereof; an incidental object being to provide a tie member in the form of a two-part housing adapted to extend over and enclose the carriage screw, and said housing being threaded to provide a slot in which the carriage reciprocates and by which it is guided.

It is still further proposed to incorporate in a reel embodying the said invention, a further tie member in the form of a thumb rest arranged above the first mentioned carriage housing tie member, and being in the form of a plate extending between and secured to the end rings or plates and having substantial area for the accommodation of the thumb of a user.

Still further objects subsidiary to or resulting from the aforesaid objects, or from the construction or operation of the invention as it may be carried into effect, will become apparent as the said invention is hereinafter further disclosed.

In carrying the said invention into effect, I may provide, in a fishing reel having end plates and a carriage screw mounted therebetween and carrying a line guiding carriage, a tie member in the form of a two part housing positioned about the carriage screw and forming a mounting for the end plates which I secure to the extremities of the said tie member, the said tie member being divided to provide a slot in its upper part for the reception of and to act as a guide for the said carriage; and I also propose to arrange between the said end plates and above the aforesaid carriage housing tie member, a further tie member in the form of a thumb plate secured at its extremities to the said end plates.

All of which is more particularly described hereinafter, by way of example, having reference to the accompanying drawing, in which—

Figure 1 is an elevation of a fishing reel embodying the said invention;

Figure 2 is a transverse section of the same, taken on the line 2×—2× of Figure 1;

Figure 3 is a fragmentary perspective view of the said reel illustrating the parts shown in Figure 2; and Figure 4 is a fragmentary section on the line 4×—4×, Figure 2.

Similar characters of reference indicate similar parts in the several figures of the drawing, and Figure 3 is drawn to a larger scale than are Figures 1 and 2.

1 and 2 are the end plates of a fishing reel between which the spool 3 is located, upon which spool the line is wound, and for the guiding of a line to and from the said spool a line guide 4 is provided, supported by a carriage 5 which is reciprocally carried by a carriage screw 6 rotatably mounted between the end plates 1 and 2 and adapted to be rotated by the handle 7 of the reel in any suitable manner, mechanisms for that purpose being commonly provided in fishing reels and therefore not illustrated in the accompanying drawing.

The reel is supported on a base plate 8 by transverse members 9 and 10 extending between and connected to the end plates; and 11 is a tie rod also extending between the plates for the purpose of assisting in securing them in relative position. Ordinarily a number of such tie rods are provided and arranged around the marginal portions of the end plates to rigidly secure the plates together, such tie rods being, however, limited to that particular purpose.

In this case, the main bracing of the end plates is effected by a special two part tie member 12 which is of approximately inverted and divided U-shaped configuration in cross section, being positioned over the carriage screw 6 whereby the front and rear portions 13 and 14 of the said tie member 12 form aprons which extend substantially below and protectively conceal the said carriage screw; and the ends of the said front portion 13 are provided with inwardly extending ear pieces 15 which bear against and engage the inner faces of the rings 1 and 2 and are suitably secured thereto such as by rivets 16.

Preferably the entire ends of the said tie member 12 are in abutment with the inner faces of the end plates so that a very substantial bearing thereagainst is obtained, giving great rigidity to the reel as will be well understood.

In addition to protectively housing the carriage screw as explained, the upper part of the tie member 12 is provided with a longitudinal slot 17 therein formed by the spaced division of the two parts of the said tie member in which slot the carriage 5 of the line guide extends and in which the said carriage is slidable and is guided transversely of the reel, so that the provision of further means for the guiding of the carriage is rendered unnecessary.

Still further, I may provide above the said tie member 12 a further tie member 18 in the form of a plate extending between the end plates 1 and 2 and secured thereto in any desirable manner, this tie member also presenting substantial end areas to the inner surface of the end plates and being of such form and configuration that it may serve as a thumb rest for the user in a manner which will be readily apparent to those conversant with the use of fishing reels.

By the embodiment of the said invention in a fishing reel such as in the manner described, simplicity is gained in the housing and guiding of the carriage screw and line carriage and rigidity and durability is added to the reel, the appearance of which is further enhanced by such arrangement and the effective concealing of the working parts of the line guide.

This invention may be developed within the scope of the following claim without departing from the essential features of the said invention, and it is desired that the specification and drawing be read as merely illustrative and not in a limiting sense, except as necessitated by the prior art.

What I claim is:—

In a fishing reel wherein a spool is eccentrically mounted between reel end plates, and a line level wind mechanism including a line guide is operatable in synchronism with said spool; inner and outer tie members for the end plates of said reel, said outer members conforming in curvature to the circumference of said end plates and said inner member conforming in circumference to said spool, one of said outer members having an inturned edge cooperating with the inner member in forming a guide for part of said level wind mechanism and one of said outer members forming a guard over the outer free end of said line guide, the guard member being of a width to form a thumb rest extending from one end plate to the other, and said outer members having ears attached to said end plates.

In testimony whereof I affix my signature.

WILLIAM SCHMID.